US007818621B2

(12) United States Patent
Childress et al.

(10) Patent No.: US 7,818,621 B2
(45) Date of Patent: Oct. 19, 2010

(54) DATA CENTER BOOT ORDER CONTROL

(75) Inventors: Rhonda L. Childress, Austin, TX (US);
David Bruce Kumhyr, Austin, TX (US);
Christopher L. Molloy, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 11/622,033

(22) Filed: Jan. 11, 2007

(65) Prior Publication Data
US 2008/0172553 A1 Jul. 17, 2008

(51) Int. Cl.
*G06F 11/00* (2006.01)
(52) U.S. Cl. .................................. 714/36; 714/4; 713/1
(58) Field of Classification Search ............ 714/23, 714/36, 4
See application file for complete search history.

(56) References Cited

U.S. PATENT DOCUMENTS

| 5,854,905 | A | 12/1998 | Garney | |
|---|---|---|---|---|
| 6,430,687 | B1 | 8/2002 | Aguilar et al. | |
| 6,553,432 | B1 | 4/2003 | Critz et al. | |
| 6,728,875 | B1 | 4/2004 | Aguilar et al. | |
| 6,748,525 | B1 * | 6/2004 | Hubacher et al. | 713/1 |
| 7,181,604 | B2 * | 2/2007 | King et al. | 713/1 |
| 2002/0099935 | A1 * | 7/2002 | Smith et al. | 713/2 |
| 2003/0069951 | A1 | 4/2003 | Fong et al. | |
| 2004/0003082 | A1 * | 1/2004 | Abbondanzio et al. | 709/225 |
| 2004/0059900 | A1 * | 3/2004 | Backman et al. | 713/1 |
| 2004/0162898 | A1 * | 8/2004 | Rich | 709/224 |
| 2004/0162977 | A1 * | 8/2004 | King et al. | 713/2 |
| 2004/0268112 | A1 * | 12/2004 | Mittal et al. | 713/2 |
| 2006/0179294 | A1 * | 8/2006 | Chu et al. | 713/2 |

* cited by examiner

*Primary Examiner*—Yolanda L Wilson
(74) *Attorney, Agent, or Firm*—Schmeiser, Olsen & Watts; Arthur J. Samodovitz

(57) ABSTRACT

A method and system for determining an optimal order for rebooting servers in a data center. After an abnormal shutdown event in a data center, a power restoration management (PRM) server detects a restoration of power capable of being available for a rebooting of servers in the data center. A power restoration management program automatically and dynamically determines an optimal order for rebooting the servers, where the order is a result of applying policies based on weighted factors. The PRM server or a manual process reboots the servers in the determined order. The rebooting includes an enhancement of a financial position of an organizational entity associated with the data center. The enhancement of the financial position includes increasing a financial profit of the organizational entity or decreasing a financial loss of the organization entity.

20 Claims, 5 Drawing Sheets

DATA CENTER BOOT ORDER CONTROL

FIELD OF THE INVENTION

The present invention relates to a method and system for determining an optimal order for rebooting a plurality of servers in a data center.

BACKGROUND OF THE INVENTION

Conventionally, managing the restoration of power following a power outage at a data center involves procedures that are expensive in terms of required human resources or inflexible due to the use of predetermined plans for powering up systems. Further, existing power solutions for data centers are aimed at controlling a power strip or source that is inserted in line prior to the machines in the data center. Event if such power strips have programmable access, they are inoperative in a power off situation, thereby making the power strips difficult or impossible to use with a master plan for restoring power to a data center. Thus, there exists a need to overcome at least one of the preceding deficiencies and limitations of the related art.

SUMMARY OF THE INVENTION

The present invention provides a computer-implemented method of determining an optimal order for rebooting a plurality of servers in a data center. The method includes, for example, the steps of (1) automatically detecting a restoration of power following an abnormal shutdown event in a data center; (2) automatically and dynamically determining, in response to detecting the restoration of power, an order for a rebooting of servers included in the data center; and (3) rebooting the servers in the order determined in step (2). Step (1) is performed by a power restoration management server of a computing system. The restoration of power detected in step (1) is capable of being available for the rebooting of the servers. Determining the order in step (2) includes applying one or more policies. Rebooting in step (3) enhances the financial position of an entity associated with the data center. The enhancement of the financial position of the entity includes increasing a financial profit or decreasing a financial loss of the entity.

A computing system, computer program product, and process for supporting computing infrastructure corresponding to the above-summarized method are also described and claimed herein.

Advantageously, the present invention provides a technique for dynamically determining an optimal order for rebooting a plurality of servers. Further, the reboot procedure described herein becomes more advantageous to the operation of a data center as the ratio of the number of servers to operations staff increases. Still further, the advantages of the reboot technique of the present invention can be extended to lights out data centers and remotely managed data centers.

DETAILED DESCRIPTION OF THE INVENTION

The present invention provides a power restoration management tool that controls the order and timing of restoration of power and the rebooting of multiple servers in, for example, a data center. The reboot order is dynamically and automatically determined and requires no manual intervention. Having such a dynamically prescribed and orderly reboot procedure provides a data center boot up that draws on an appropriate level of power and wattage.

System Overview

Figure 1A:
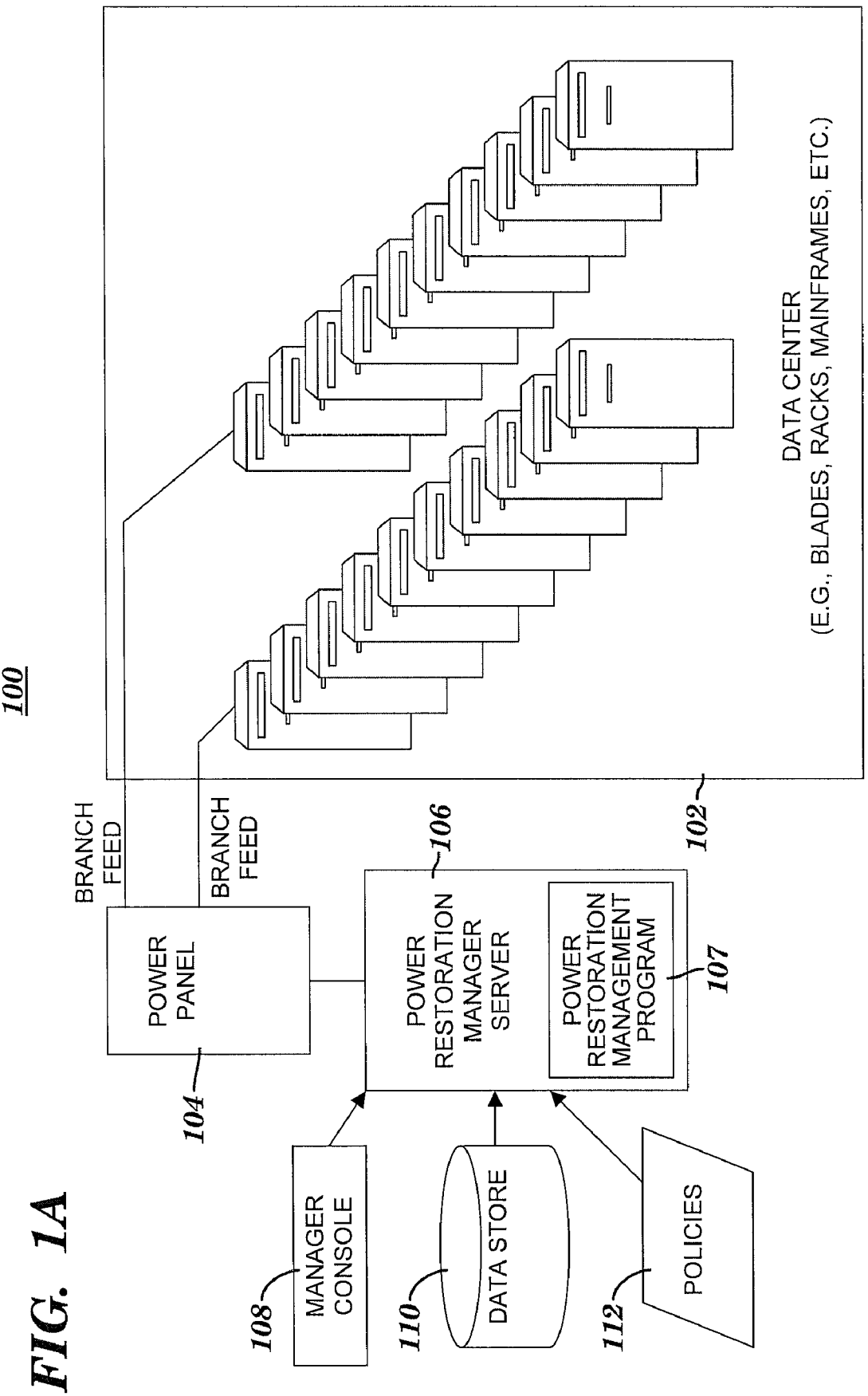
FIG. 1A is a block diagram of a system for determining an optimal order to reboot servers in a data center which includes a power panel capable of processing digital command signals, in accordance with embodiments of the present invention.

FIG. 1A is a block diagram of a system for determining an optimal order to reboot servers in a data center that includes a power panel capable of processing digital command signals, in accordance with embodiments of the present invention. System 100 includes a data center 102, a power panel 104 coupled to data center 102, and a power restoration manager (PRM) server 106 (a.k.a. power restoration management server) coupled to power panel 104. In one embodiment, PRM server 106 includes a power restoration management program 107. In another embodiment, power restoration management program 107 is executed in a computing unit (not shown) that is separate from PRM server 106. Coupled to PRM server 206 and included in system 100 are a manager console 108, a data store 110 and one or more policies 112 included in another data store. Data center 102 includes one or more groups of servers (e.g., blades, racks, mainframes, etc.). Power panel 104 provides power to each group of servers in data center 102 via a branch feed. Logic of power restoration management program 107 executes in PRM server 106 or another computing unit to control power distribution to server in data center 102 via power panel 104. The control of power distribution by power restoration management program 107 includes a control of the timing of power restoration and the order of rebooting for each server in data center 102 following a power outage at data center 102. In the embodiment illustrated by FIG. 1A, power panel 104 includes logic to process digital command signals sent from PRM manager server 107.

Manager console 108 provides an interface to PRM server 106 so that a human operator, either remotely or in data center 102, is able to monitor the functioning of PRM server 106 and alter policies 112. One or more policies 112 (a.k.a. boot order determination policies) include rules (e.g., in XML format) that are applied by power restoration management program 107 to specify a prioritization of servers included in data center 102. The one or more policies are based on factors associated with the servers included in data center 102 or the load provided by the restoration of power after an abnormal shutdown event. As used herein, an abnormal shutdown event of a data center is defined as the data center experiencing an unplanned power outage. The specified prioritization of servers determines an optimal order for rebooting the servers included in data center 102 following an abnormal shutdown event at data center 102. The application of policies 112 by power restoration management program 107 includes utilizing data from data store 110.

Data store 110 includes a last state of operations of a plurality of servers of data center 102, where the last state of a server in data center 102 is the state of the server existing at a time of an abnormal shutdown event at data center 102. As one example, data store 110 includes an XML implementation of a Service Level Agreement (SLA) between an organizational entity associated with data center 102 and another organizational entity utilizing a service provided by a server of data center 102 (e.g., between a corporation that is providing the service and a customer of the corporation that utilizes the service).

Figure 1B:
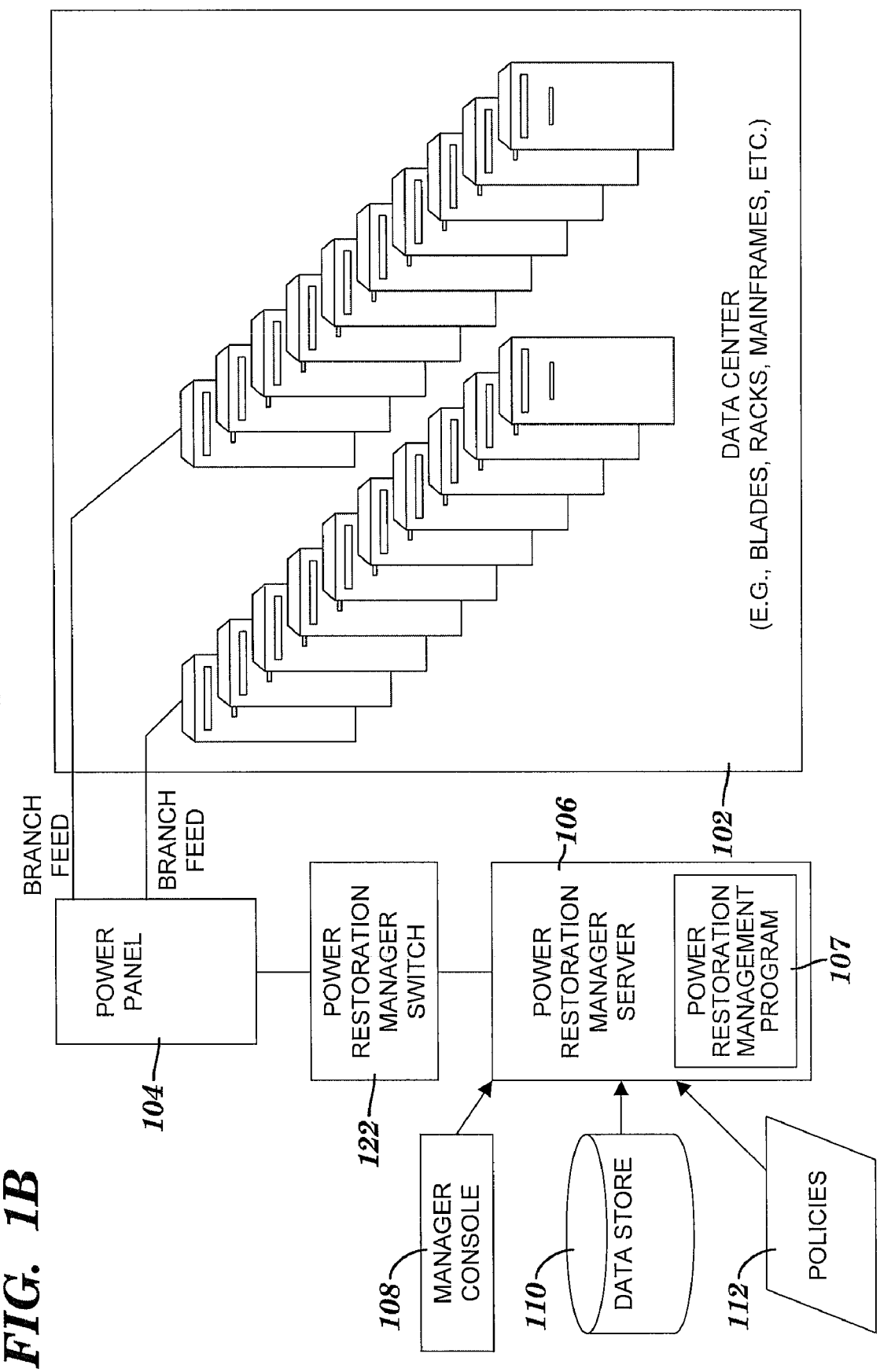
FIG. 1B is a block diagram of a system for determining an optimal order to reboot servers in a data center which includes a power panel incapable of processing digital command signals, in accordance with embodiments of the present invention.

FIG. 1B is a block diagram of a system for determining an optimal order to reboot servers in a data center that includes a power panel incapable of processing digital command signals, in accordance with embodiments of the present invention. System 120 includes the components of system 100 (see FIG. 1A) (e.g., data center 102, power panel 104, PRM server 106 that includes power restoration management program 107, manager console 108, data store 110 and one or more policies 112). In another embodiment, power restoration management program 107 executes in a computing unit (not shown) that is separate from PRM server 106. The configuration and relationship of the components in system 120 are equivalent to system 100 (see 100) except that instead of PRM server 106 being directly coupled to power panel 104, PRM server is coupled to a power restoration manager switch 122 that has direct access to power panel 104. Power restoration manager switch 122 provides PRM server 106 with an interface to power panel 104 because in the embodiment illustrated by FIG. 1B, power panel 104 lacks logic to accept digital command signals from PRM server 106.

Data Center Operations Prior to Restart

Figure 2:
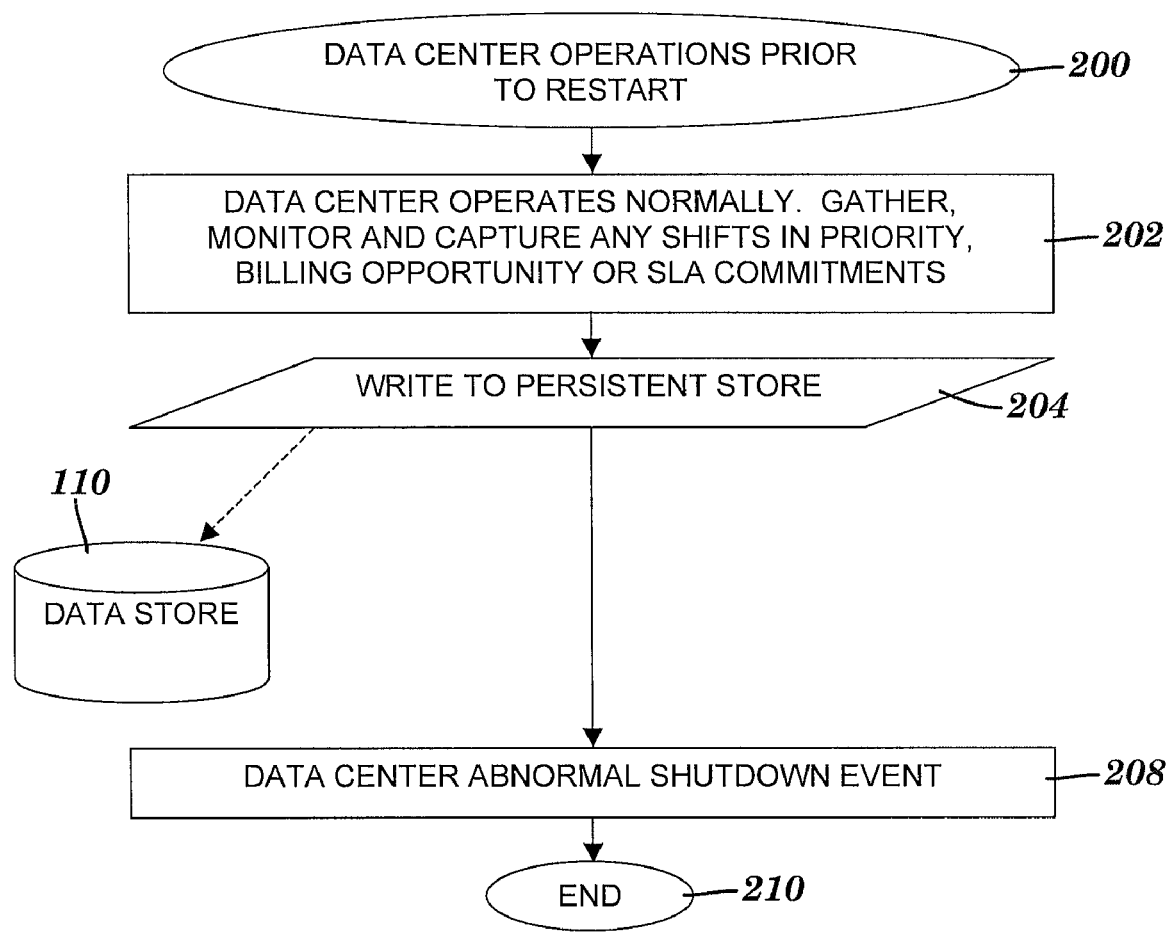
FIG. 2 is a flow diagram of a process of operating a data center prior to a restart using the system of FIG. 1A or 1B, in accordance with embodiments of the present invention.

FIG. 2 is a flow diagram of a process of operating a data center prior to a restart using the system of FIG. 1A or 1B, in accordance with embodiments of the present invention. A process of operating data center 102 (see FIG. 1A or FIG. 1B) prior to a restart begins at step 200. In step 202, data center 102 (see FIG. 1A or FIG. 1B) normally. Step 202 also includes PRM server 106 (see FIG. 1A or FIG. 1B) gathering, monitoring and capturing any dynamic shifts (i.e., changes) in prioritization related to an order of rebooting servers, billing opportunity (e.g., billing rates) or SLA commitments relative to the servers included in data center 102 (see FIG. 1A or FIG. 1B), or other factors that are described below relative to FIG. 3. For example, an operator utilizing manager console 108 (see FIG. 1A) enters an XML document that dynamically changes the financial penalty owed by a corporation to its customer in response to a failure to maintain a server uptime specified in the SLA between the corporation and the customer. In this example, PRM server 106 (see FIG. 1A) then monitors and captures the change in the financial penalty.

In step 204, PRM server 106 (see FIG. 1A or FIG. 1B) writes the changes gathered in step 202 to data store 110. In the example described above relative to step 202, PRM server 106 (see FIG. 1A) writes the change to the financial penalty in the SLA to data store 110. In step 208, data center 102 (see FIG. 1A or FIG. 1B) experiences an abnormal shutdown event, which shuts down the servers included in data center 102 (see FIG. 1A or FIG. 1B). The process of FIG. 2 ends at step 210.

Data Center Restart

Figure 3:
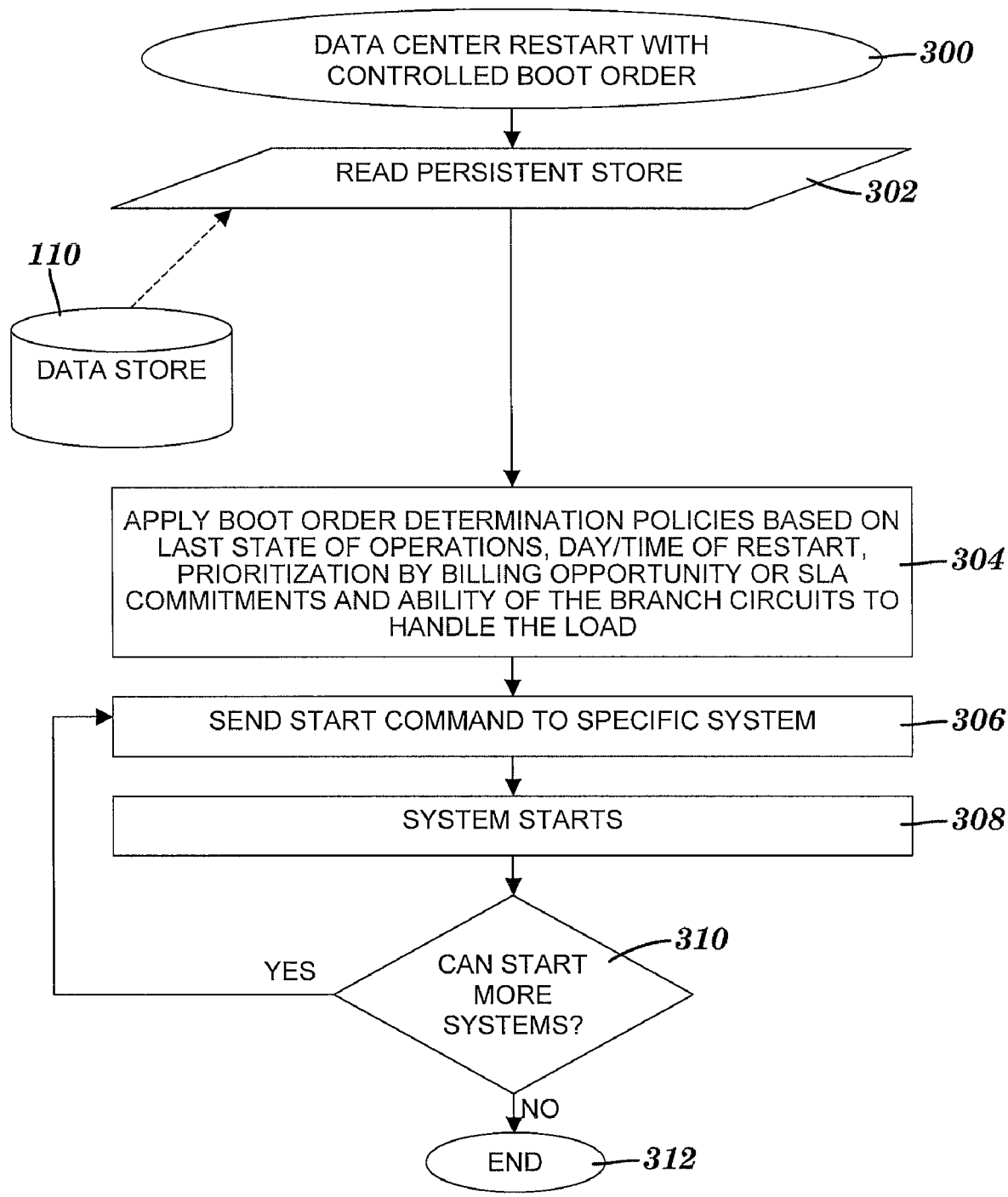
FIG. 3 is a flow diagram of a process of restarting a data center with a controlled boot order using the system of FIG. 1A or 1B, in accordance with embodiments of the present invention.

FIG. 3 is a flow diagram of a process of restarting a data center with a controlled reboot order (a.k.a. boot order) using the system of FIG. 1A or 1B, in accordance with embodiments of the present invention. The process of restarting data center 102 (see FIG. 1A or FIG. 1B) with a reboot order controlled by PRM server 106 (see FIG. 1A or FIG. 1B) starts at step 300, which follows the abnormal shutdown event in step 208 of FIG. 2. Prior to step 302, power is restored and becomes available to power panel 104 (see FIG. 1A or FIG. 1B) and PRM server 106 (see FIG. 1A or FIG. 1B) detects the restoration of power, which is capable of being available for rebooting the servers included in data center 102 (see FIG. 1A or FIG. 1B). In step 302, PRM server 106 (see FIG. 1A or FIG. 1B) reads from data store 110 the last state of the servers included in data center 102 (see FIG. 1A or FIG. 1B), where the last state is the state of operations of the servers at the time of the abnormal shutdown event of step 208 of FIG. 2 (i.e., the servers' state existing immediately prior to the abnormal shutdown). The last state includes data related to a prioritization of servers included in data center 102 (see FIG. 1A or FIG. 1B) for the purposes of rebooting the servers in an optimal order, or billing opportunity (e.g., billing rates) or SLA commitments relative to the servers included in data center 102 (see FIG. 1A or FIG. 1B).

In step 304, power restoration management program 107 (see FIG. 1A or FIG. 1B) automatically and dynamically applies boot order determination policies 112 (see FIG. 1A or FIG. 1B) and automatically and dynamically determines an order for rebooting the servers included in data center 102 (see FIG. 1A or FIG. 1B). The application of policies 112 (see FIG. 1A or FIG. 1B) in step 304 is based on various weighted factors, such as the last state of server operations read in step 302, the day and time of the restart of the servers included in data center 102 (see FIG. 1A or FIG. 1B), the prioritization of the servers included in data center 102 (see FIG. 1A or FIG. 1B) determined by billing opportunity or SLA commitments, the ability of branch circuits connecting power panel 104 (see FIG. 1A or FIG. 1B) to servers in data center 102 (see FIG. 1A or FIG. 1B) to handle the load to be generated by the restoration of power, and other factors listed below.

The reboot order that is determined in step 304 is an optimal order in that rebooting the servers in this order enhances the financial position of an organizational entity associated with the data center (e.g., a corporation that manages the servers of the data center and that enters into SLAs with customers who utilize the servers of the data center). The determined reboot order enhances the financial position of the organizational entity by increasing a financial profit experienced by the organizational entity or decreasing a financial loss experienced by the organizational entity.

The aforementioned factor relative to the ability of branch circuits to handle load takes into account the maximum sustainable initial surge that can be induced without exceeding incoming availability (i.e., triggering a secondary outage) and/or the number of servers on each branch circuit that can be restarted without tripping the breaker limit for that branch.

As described above relative to step 304, weighted factors forming the basis of the application of the one or more policies 112 (see FIG. 1A or FIG. 1B) allow the reboot order to be dynamically determined based on variables representing a state of the operation of servers at the time of the abnormal shutdown event or a desired state of server operation to be attained in response to restarting the servers. Examples of such factors are listed below:

1. Commitments for uptime: If a commitment for uptime of a first server based on an SLA, a calculated SLA breach or contractual agreement is larger than another, similarly based commitment for uptime of a second server, then the reboot order determined in step 304 places the reboot of the first server earlier than the reboot of the second server.

2. Billing opportunity: If two servers are associated with the same financial penalty for excessive downtime, but a first customer utilizing the first server offers to pay a financial incentive to have the first server rebooted in a specified period of time and no such financial incentive is associated with rebooting the second server, then the reboot order determined in step 304 places the reboot of the first server earlier than the reboot of the second server.

3. Workload: If a workload of a first server at the time of the abnormal shutdown event is greater than a workload of a second server at the time of the abnormal shutdown event, then the reboot order determined in step 304 places the reboot of the first server earlier than the reboot of the second server.

4. Required order of systems: Certain systems need to be available in a certain order. As one example, before rebooting a web commerce server, the web commerce server's database server needs to be rebooted and available to the web commerce server. Thus, in this example, the reboot of the database server is placed earlier than the reboot of the web commerce server in the reboot order of step 304. As another example, if multiple application servers rely on a single database server, then the database server is given priority over the application servers in the reboot order of step 304.

5. Revenue generated: Systems that generate more revenue are placed earlier in the reboot order of step 304. For example, an airline reservation system that generates more revenue than a pharmaceutical information site would have a higher reboot priority within a single data center that serves both systems.

6. Criticality: If a first server's function has a higher level of criticality than a second server's function based on predefined criteria, then the reboot order determined in step 304 places the reboot of the first server earlier than the reboot of the second server. For example, certain governmental servers and e911 servers provide services that are critical enough to cause those servers to be placed earlier in the reboot order of step 304. In one embodiment, a "good will" factor assigns the highest criticality to a favored customer's system. In the case in which a good will factor applies, the reboot order determined in step 304 assigns the highest priority in the reboot order to the favored customer's system, thereby overriding the order imposed by other factors.

7. State of server operations: If a first server is in an operable and active state at the time of the abnormal shutdown event and a second server is in a non-operable or non-active state at the time of the abnormal shutdown event, then the reboot order determined in step 304 places the reboot of the first server earlier than the reboot of the second server.

In one embodiment, weights are assigned in a one-to-one correspondence to factors included in the above-described factors associated with step 304, where the weights determine a sequence for applying policies in step 304. The weights are customer-programmable or pre-assigned by system 100 (see FIG. 1A) or system 120 (see FIG. 1B).

In step 306, PRM server 106 (see FIG. 1A or FIG. 1B) sends a start command to initialize a specific server according to the optimal order determined in step 304. The specific server to be initialized is referred to as a system in the text of FIG. 3. The start command is, for example, a Preboot Execution Environment (PXE) boot message or an Advanced Power Management (APM) control sequence. PXE is an environment to bootstrap computers using a network interface card independently of available data storage devices or installed operating systems. PXE was introduced as part of the Wired for Management framework offered by Intel® of Santa Clara, Calif. APM is an API developed by Intel® and Microsoft® of Redmond, Wash., which allows a BIOS to perform power management, such as reducing the CPU speed, turning off the hard disk or turning off the power to a display after a preset period of inactivity in order to conserve electrical power.

In step 308, the specific server that was sent the start command in step 306 receives the start command and starts up. PRM server 106 (see FIG. 1A or FIG. 1B) monitors the amount of power available to data center 102 (see FIG. 1A or FIG. 1B) and determines in inquiry step 310 whether more servers included in data center 102 (see FIG. 1A or FIG. 1B) can be started based on the power available. If more servers can be started as determined by step 310, then the process of FIG. 3 loops back to step 306 where PRM server 106 (see FIG. 1A or FIG. 1B) sends a start command to another specific server included in data center 102 (see FIG. 1A or FIG. 1B). If step 310 determines that no other servers can be started, then the restart process of FIG. 3 ends at step 312.

In an alternate embodiment, the determination of the optimal reboot order in step 304 is followed by a manual process of rebooting the servers of data center 102 (see FIG. 1A or FIG. 1B) according to the optimal reboot order.

Interaction with Provisioning/Orchestration System

In one embodiment, PRM server 106 (see FIG. 1A or FIG. 1B) consults with a provisioning system (not shown) and/or an orchestration system (not shown) to obtain plans to alter the booting order of the servers of data center 102 (see FIG. 1A or FIG. 1B) that take into account predetermined, pending server changes. These pending server changes are then initiated in the process of FIG. 3, rather than simply restarting normal operations and then reprovisioning according to the plans of the provisioning or orchestration system. For example, since Memorial Day is a business's most active sales day, the business has a predetermined plan to reconfigure its back office systems to provide more in-store point of sale capacity on Memorial Day. If a power outage preceded the Memorial Day reprovisioning and the restart of the business's servers is to be performed immediately prior to Memorial Day, PRM server 106 (see FIG. 1A) generates the reboot order in step 304 that provides the predetermined Memorial Day reprovisioning prior to the rebooting of the servers in steps 306, 308 and 310, instead of restarting the servers in normal mode and then reprovisioning according to the Memorial Day plan.

An example of a product that provides the aforementioned provisioning and orchestration features is the IBM Tivoli Intelligent Orchestrator (ITIO) offered by International Business Machines Corporation of Armonk, N.Y.

Computing System

Figure 4:
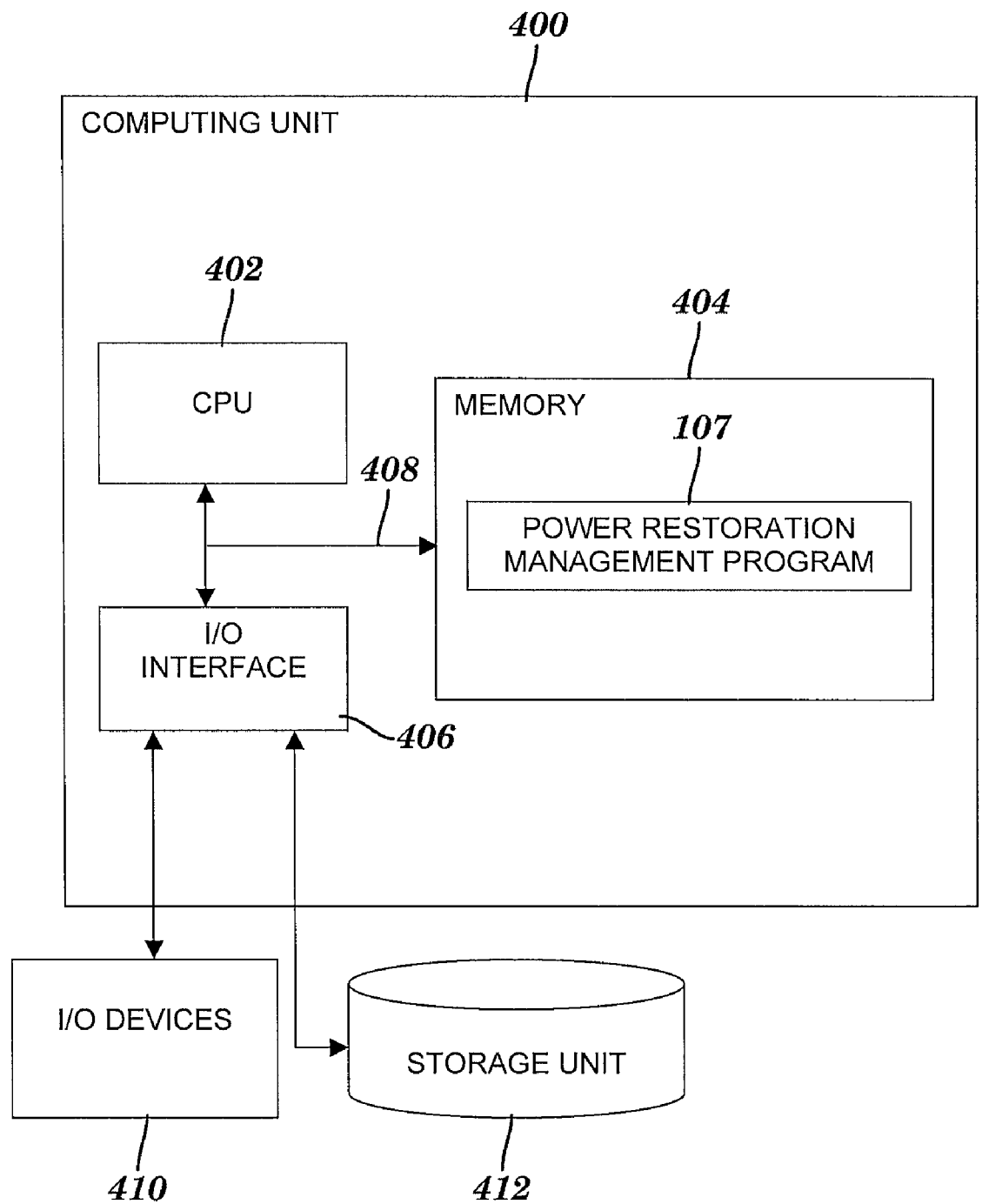
FIG. 4 is a block diagram of a computing system that is included in the systems of FIGS. 1A and 1B and that implements the processes of FIGS. 2 and 3, in accordance with embodiments of the present invention.

FIG. 4 is a block diagram of a computing unit that includes power restoration management program 107 shown in FIGS. 1A and 1B and that implements the process of FIGS. 2 and 3, in accordance with embodiments of the present invention. In one embodiment, computing unit 400 is PRM server 107 (see FIG. 1A or FIG. 1B). In another embodiment, computing unit 400 is separate from the PRM server. Computing unit 400 generally comprises a central processing unit (CPU) 402, a memory 404, an input/output (I/O) interface 406, a bus 408, I/O devices 410 and a storage unit 412. CPU 402 performs computation and control functions of computing unit 400. CPU 402 may comprise a single processing unit, or be distributed across one or more processing units in one or more locations (e.g., on a client and server).

Memory 404 may comprise any known type of data storage media, including bulk storage, magnetic media, optical media, random access memory (RAM), read-only memory (ROM), a data cache, a data object, etc. Cache memory elements of memory 404 provide temporary storage of at least some program code (e.g., power restoration management program 107) in order to reduce the number of times code must be retrieved from bulk storage during execution. Moreover, similar to CPU 402, memory 404 may reside at a single physical location, comprising one or more types of data storage, or be distributed across a plurality of physical systems in various forms (e.g., Network Attached Storage (NAS), Storage Area Networks (SANs), external drives, etc.). Further, memory 404 can include data distributed across, for example, a LAN, WAN or SAN (not shown).

I/O interface 406 comprises any system for exchanging information to or from an external source. I/O devices 410 comprise any known type of external device, including a display monitor, keyboard, mouse, printer, speakers, handheld device, printer, facsimile, network device (e.g., hub, router, or switch), etc. Bus 408 provides a communication link between each of the components in computing unit 400, and may comprise any type of transmission link, including electrical, optical, wireless, etc.

I/O interface 406 also allows computing unit 400 to store and retrieve information (e.g., program instructions or data) from an auxiliary storage device 412. The auxiliary storage device may be a non-volatile storage device such as a magnetic disk drive or an optical disk drive (e.g., a CD-ROM drive which receives a CD-ROM disk). Computing unit 400 can store and retrieve information from other auxiliary storage devices (not shown), which can include a direct access storage device (DASD) (e.g., hard disk or floppy diskette), a magneto-optical disk drive, a tape drive, or a wireless communication device. In one embodiment, one of the auxiliary storage devices described above includes data store 110 (see FIG. 1A or FIG. 1B).

Memory 404 includes power restoration management program 107 for determining an optimal order for rebooting a plurality of servers in a data center. Program 107 implements steps of the processes of FIGS. 2 and 3. Further, memory 404 may include other systems not shown in FIG. 4, such as an operating system (e.g., Linux) that runs on CPU 402 and provides control of various components within and/or connected to computing unit 400.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of program 107 for determining an optimal order for rebooting a plurality of servers in a data center for use by or in connection with a computing system 400 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 404, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the present invention's process of determining an optimal order for rebooting a plurality of servers in a data center. Thus, the present invention discloses a process for supporting computer infrastructure, comprising integrating, hosting, maintaining and deploying computer-readable code into a computing system (e.g., computing unit 400), wherein the code in combination with the computing system is capable of performing a method of determining an optimal order for rebooting a plurality of servers in a data center.

In another embodiment, the invention provides a business method that performs the process steps of the invention on a subscription, advertising and/or fee basis. That is, a service provider, such as a Solution Integrator, can offer to create, maintain, support, etc. a process of the present invention that includes determining an optimal order for rebooting a plurality of servers in a data center. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of determining an optimal order for rebooting a plurality of servers in a data center, said method comprising:
   automatically detecting, by a computing unit of a computing system and subsequent to an abnormal shutdown event in a data center, a restoration of power capable of being available for a rebooting of a plurality of servers in said data center, said abnormal shutdown event being said data center experiencing an unplanned power outage of said power capable of being available for said rebooting;
   automatically and dynamically determining, by a program executing in said computing system and in response to said automatically detecting, an order for said rebooting of said plurality of servers, said automatically and dynamically determining said order including applying a policy based on a comparison of commitments for a plurality of uptimes of said plurality of servers, said commitments designated by a plurality of service level agreements (SLAs), said SLAs associated with said servers in a one-to-one correspondence; and
   rebooting said plurality of servers in said order.

2. The method of claim 1, wherein said applying said policy includes placing a first server of said plurality of servers in a position that is earlier in said order than another position associated with a second server of said plurality of servers, said first server associated with a first uptime of said plurality of uptimes, said second server associated with a second uptime of said plurality of uptimes, said placing being a result of said comparison, and said comparison indicating that said first uptime is greater than said second uptime.

3. The method of claim 1, further comprising modifying said order, said modifying including utilizing a factor associated with a load provided by said restoration of power, and wherein said factor is selected from the group consisting of:
a maximum sustainable initial power surge that can be induced by said restoration of power without triggering a secondary power outage in said data center, and
a number of servers on a branch circuit of said data center that can be restored with power by said restoration of power without tripping a breaker limit for said branch circuit.

4. The method of claim 1, further comprising:
assigning a first weight to said comparison of commitments for said plurality of uptimes of said plurality of servers;
assigning a second weight to a comparison among a plurality of billing rates for a plurality of services provided by said plurality of servers, said billing rates associated with customers of said organizational entity in a one-to-one correspondence, each billing rate to be paid by an associated customer;
assigning a third weight to a comparison among a plurality of workloads of said plurality of servers;
assigning a fourth weight to a comparison among a plurality of levels of criticality, said levels of criticality associated with servers of said plurality of servers in a one-to-one correspondence;
assigning a fifth weight to a comparison among a plurality of states of operability and activity, said states of operability and activity associated with servers of said plurality of servers in a one-to-one correspondence;
assigning a sixth weight to an identification of an operability status of a first service of said plurality of services, said first service provided by a first server of said plurality of servers, said operability status required prior to a reboot of one or more other servers of said plurality of servers;
assigning a seventh weight to a comparison among a plurality of desired states of operations of said plurality of servers, said desired states associated with servers of said plurality of servers in a one-to-one correspondence, wherein each desired state is based on a time to reboot an associated server of said plurality of servers via said rebooting; and
applying a plurality of policies in a sequence based on a comparison among said first weight, said second weight, said third weight, said fourth weight, said fifth weight, said sixth weight, and said seventh weight, wherein said applying said plurality of policies includes said applying said policy.

5. The method of claim 1, further comprising:
receiving, by said computing unit and from a provisioning or orchestration system, instructions associated with a predetermined reprovisioning of one or more servers of said plurality of servers; and
implementing said predetermined reprovisioning prior to said rebooting.

6. A computer-implemented method of determining an optimal order for rebooting a plurality of servers in a data center, said method comprising:
automatically detecting, by a computing unit of a computing system and subsequent to an abnormal shutdown event in a data center managed by an organizational entity, a restoration of power capable of being available for a rebooting of a plurality of servers in said data center;
automatically and dynamically determining, by a program executing in said computing system and in response to said automatically detecting, an order for said rebooting of said plurality of servers, said automatically and dynamically determining said order including applying a policy based on a comparison among a plurality of billing rates for a plurality of services provided by said plurality of servers, said plurality of billing rates associated with customers of said organizational entity, each billing rate to be paid by an associated customer; and
rebooting said plurality of servers in said order.

7. The method of claim 6, wherein said applying said policy includes placing a first server of said plurality of servers in a position that is earlier in said order than another position associated with a second server of said plurality of servers, said first server associated with a first billing rate of said plurality of billing rates, said second server associated with a second billing rate of said plurality of billing rates, said placing being a result of said comparison, and said comparison indicating that said first billing rate is greater than said second billing rate.

8. The method of claim 6, further comprising modifying said order, said modifying including utilizing a factor associated with a load provided by said restoration of power, and wherein said factor is selected from the group consisting of:
a maximum sustainable initial power surge that can be induced by said restoration of power without triggering a secondary power outage in said data center, and
a number of servers on a branch circuit of said data center that can be restored with power by said restoration of power without tripping a breaker limit for said branch circuit.

9. The method of claim 6, further comprising:
assigning a plurality of weights to a plurality of factors, said weights assigned to said factors in a one-to-one correspondence, said plurality of factors including a first factor, said first factor being said comparison among said plurality of billing rates; and
applying a plurality of policies in a sequence, said policies associated with said weights of said plurality of weights in a one-to-one correspondence, said applying said plurality of policies including said applying said policy, and said sequence being determined by a comparison among said plurality of weights.

10. The method of claim 9, wherein said plurality of servers includes a server providing a service, wherein said plurality of factors includes a second factor, and wherein said second factor is selected from the group consisting of:
a comparison of commitments for a plurality of uptimes of said plurality of servers, said commitments designated by a plurality of SLAs, said SLAs associated with said servers in a one-to-one correspondence;
a comparison among a plurality of workloads of said plurality of servers,
a comparison among a plurality of levels of criticality, said levels of criticality associated with servers of said plurality of servers in a one-to-one correspondence, a comparison among a plurality of states of operability and activity, said states of operability and criticality associated with servers of said plurality of servers in a one-to-one correspondence, an identification of an operability status of a first service of said plurality of services, said first service provided by a first server of said plurality of servers, said operability status required prior to a reboot of one or more other servers of said plurality of servers, and a comparison among a plurality of desired states of operations of said plurality of servers, said desired states associated with servers of said plurality of servers in a one-to-one correspondence, wherein each desired state is based on a time to reboot an associated server of said plurality of servers via said rebooting.

11. A computer system for determining an optimal order for rebooting a plurality of servers in a data center, said computer system comprising:

a processor;
a computer readable memory;
a computer readable storage medium;
first program instructions for automatically detecting, subsequent to an abnormal shutdown event in a data center, a restoration of power capable of being available for a rebooting of a plurality of servers in said data center, said abnormal shutdown event being said data center experiencing an unplanned power outage of said power capable of being available for said rebooting;
second program instructions for automatically and dynamically determining, in response to said automatically detecting, an order for said rebooting of said plurality of servers, wherein said automatically and dynamically determining said order includes applying a policy based on a comparison of commitments for a plurality of uptimes of said plurality of servers, said commitments designated by a plurality of service level agreements (SLAs), said SLAs associated with said servers in a one-to-one correspondence; and
third program instructions for rebooting said plurality of servers in said order,
wherein said first program instructions, said second program instructions, and said third program instructions are stored on said computer readable storage medium for execution by said processor via said computer readable memory.

12. The computer system of claim 11, wherein said applying said policy includes placing a first server of said plurality of servers in a position that is earlier in said order than another position associated with a second server of said plurality of servers, said first server associated with a first uptime of said plurality of uptimes, said second server associated with a second uptime of said plurality of uptimes, said placing being a result of said comparison, and said comparison indicating that said first uptime is greater than said second uptime.

13. The computer system of claim 11, further comprising fourth program instructions for modifying said order by utilizing a factor associated with a load provided by said restoration of power, wherein said factor is selected from the group consisting of:

a maximum sustainable initial power surge that can be induced by said restoration of power without triggering a secondary power outage in said data center, and a number of servers on a branch circuit of said data center that can be restored with power by said restoration of power without tripping a breaker limit for said branch circuit, wherein said fourth program instructions are stored on said computer readable storage medium for execution by said processor via said computer readable memory.

14. The computer system of claim 11, further comprising:
fourth program instructions for assigning a first weight to said comparison of commitments for said plurality of uptimes of said plurality of servers;
fifth program instructions for assigning a second weight to a comparison among a plurality of billing rates for a plurality of services provided by said plurality of servers, said billing rates associated with customers of said organizational entity in a one-to-one correspondence, each billing rate to be paid by an associated customer;
sixth program instructions for assigning a third weight to a comparison among a plurality of workloads of said plurality of servers;
seventh program instructions for assigning a fourth weight to a comparison among a plurality of levels of criticality, said levels of criticality associated with servers of said plurality of servers in a one-to-one correspondence;
eighth program instructions for assigning a fifth weight to a comparison among a plurality of states of operability and activity, said states of operability and activity associated with servers of said plurality of servers in a one-to-one correspondence;
ninth program instructions for assigning a sixth weight to an identification of an operability status of a first service of said plurality of services, said first service provided by a first server of said plurality of servers, said operability status required prior to a reboot of one or more other servers of said plurality of servers;
tenth program instructions for assigning a seventh weight to a comparison among a plurality of desired states of operations of said plurality of servers, said desired states associated with servers of said plurality of servers in a one-to-one correspondence, wherein each desired state is based on a time to reboot an associated server of said plurality of servers via said rebooting; and
eleventh program instructions for applying a plurality of policies in a sequence based on a comparison among said first weight, said second weight, said third weight, said fourth weight, said fifth weight, said sixth weight, and said seventh weight, wherein said applying said plurality of policies includes said applying said policy,
wherein said fourth program instructions, said fifth program instructions, said sixth program instructions, said seventh program instructions, said eighth program instructions, said ninth program instructions, said tenth program instructions, and said eleventh program instructions are stored on said computer readable storage medium for execution by said processor via said computer readable memory.

15. The computer system of claim 11, further comprising:
fourth program instructions for receiving instructions associated with a predetermined reprovisioning of one or more servers of said plurality of servers; and
fifth program instructions for implementing said predetermined reprovisioning prior to said rebooting,
wherein said fourth program instructions and said fifth program instructions are stored on said computer readable storage medium for execution by said processor via said computer readable memory.

16. A computer system for determining an optimal order for rebooting a plurality of servers in a data center, said computer system comprising:
a processor;
a computer readable memory;

a computer readable storage medium;

first program instructions for automatically detecting, subsequent to an abnormal shutdown event in said data center managed by an organizational entity, a restoration of power capable of being available for a rebooting of said plurality of servers in said data center;

second program instructions for automatically and dynamically determining an order for said rebooting of said plurality of servers in response to said automatically detecting, wherein said automatically and dynamically determining said order includes applying a policy based on a comparison among a plurality of billing rates for a plurality of services provided by said plurality of servers, said plurality of billing rates associated with customers of said organizational entity, each billing rate to be paid by an associated customer; and third program instructions for rebooting said plurality of servers in said order, wherein said first program instructions, said second program instructions, and said third program instructions are stored on said computer readable storage medium for execution by said processor via said computer readable memory.

17. The computer system of claim 16, wherein said applying said policy includes placing a first server of said plurality of servers in a position that is earlier in said order than another position associated with a second server of said plurality of servers, said first server associated with a first billing rate of said plurality of billing rates, said second server associated with a second billing rate of said plurality of billing rates, said placing being a result of said comparison, and said comparison indicating that said first billing rate is greater than said second billing rate.

18. The computer system of claim 16, further comprising fourth program instructions for modifying said order by utilizing a factor associated with a load provided by said restoration of power, wherein said factor is selected from the group consisting of:

a maximum sustainable initial power surge that can be induced by said restoration of power without triggering a secondary power outage in said data center, and a number of servers on a branch circuit of said data center that can be restored with power by said restoration of power without tripping a breaker limit for said branch circuit, wherein said fourth program instructions are stored on said computer readable storage medium for execution by said processor via said computer readable memory.

19. The computer system of claim 16, further comprising:

fourth program instructions for assigning a plurality of weights to a plurality of factors, said weights assigned to said factors in a one-to-one correspondence, said plurality of factors including a first factor, said first factor being said comparison among said plurality of billing rates; and fifth program instructions for applying a plurality of policies in a sequence, said policies associated with said weights of said plurality of weights in a one-to-one correspondence, said applying said plurality of policies including said applying said policy, and said sequence being determined by a comparison among said plurality of weights, wherein said fourth program instructions and said fifth program instructions are stored on said computer readable storage medium for execution by said processor via said computer readable memory.

20. The computer system of claim 19, wherein said plurality of servers includes a server providing a service, wherein said plurality of factors includes a second factor, and wherein said second factor is selected from the group consisting of:

a comparison of commitments for a plurality of uptimes of said plurality of servers, said commitments designated by a plurality of SLAs, said SLAs associated with said servers in a one-to-one correspondence;

a comparison among a plurality of workloads of said plurality of servers, a comparison among a plurality of levels of criticality, said levels of criticality associated with servers of said plurality of servers in a one-to-one correspondence, a comparison among a plurality of states of operability and activity, said states of operability and criticality associated with servers of said plurality of servers in a one-to-one correspondence, an identification of an operability status of a first service of said plurality of services, said first service provided by a first server of said plurality of servers, said operability status required prior to a reboot of one or more other servers of said plurality of servers, and a comparison among a plurality of desired states of operations of said plurality of servers, said desired states associated with servers of said plurality of servers in a one-to-one correspondence, wherein each desired state is based on a time to reboot an associated server of said plurality of servers via said rebooting.

* * * * *